No. 860,969. PATENTED JULY 23, 1907.
W. L. R. EMMET.
ELASTIC FLUID TURBINE.
APPLICATION FILED DEC. 22, 1906.
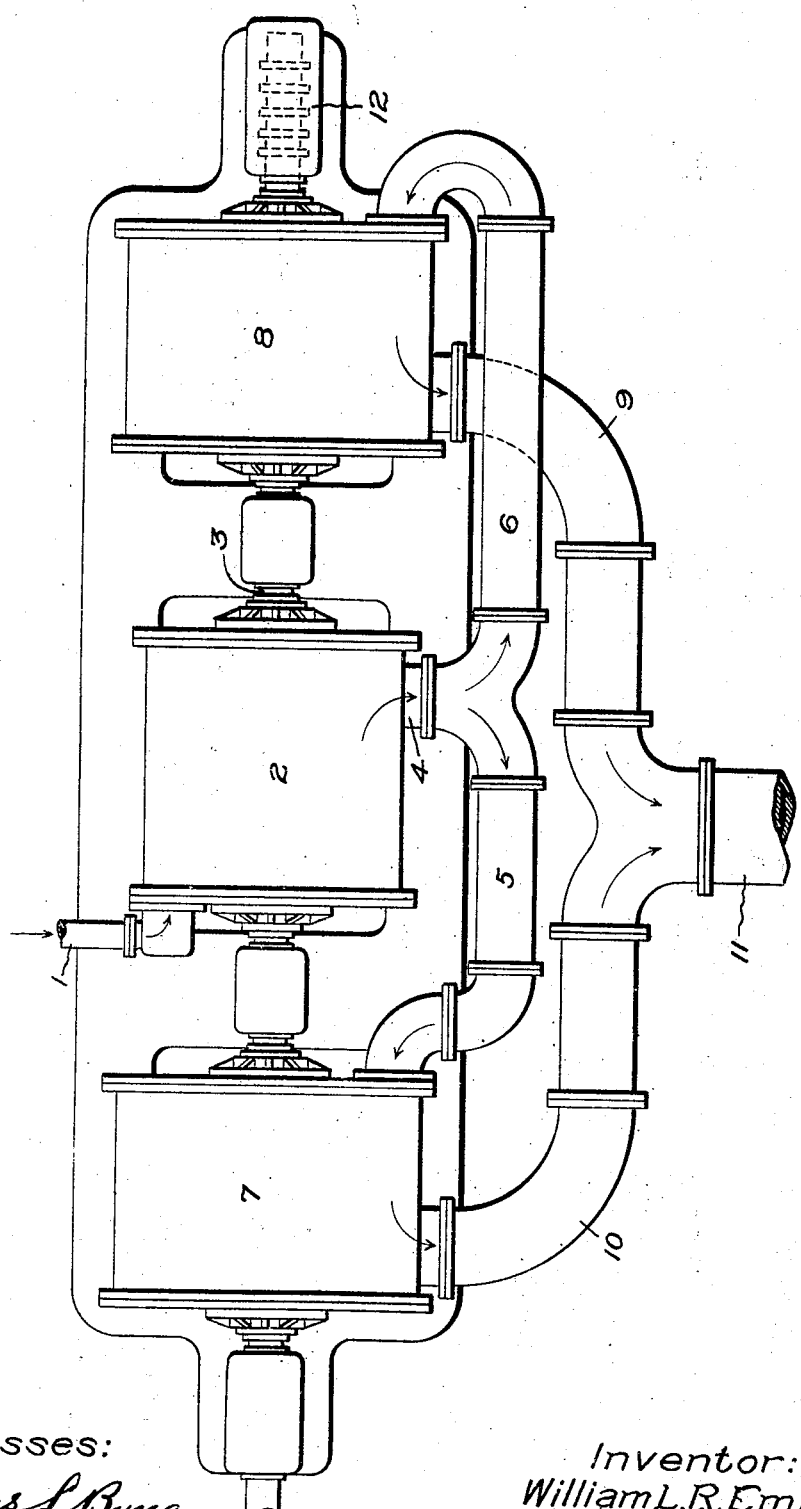
Witnesses:
Marcus L. Byng.
J. Ellis Glen.
Inventor:
William L. R. Emmet,
by Alrich Davis
Atty.

UNITED STATES PATENT OFFICE.

WILLIAM L. R. EMMET, OF SCHENECTADY, NEW YORK, ASSIGNOR TO GENERAL ELECTRIC COMPANY, A CORPORATION OF NEW YORK.

ELASTIC-FLUID TURBINE.

No. 860,969.      Specification of Letters Patent.      Patented July 23, 1907.

Application filed December 22, 1906. Serial No. 349,028.

*To all whom it may concern:*

Be it known that I, WILLIAM L. R. EMMET, a citizen of the United States, residing at Schenectady, county of Schenectady, State of New York, have invented certain new and useful Improvements in Elastic-Fluid Turbines, of which the following is a specification.

This invention relates to elastic fluid turbines of a type wherein a material end thrust exists while in operation and its object is to provide such an arrangement of several turbines or turbine elements or sections which drive a common shaft that the thrust of the turbines or elements will either be wholly or to a large extent balanced.

In the drawing which shows one embodiment of my invention, steam from a suitable source is admitted by the pipe 1 to the turbine element 2, which may comprise one, two or more stages of a compound turbine if desired, mounted on the shaft 3. The exhaust from this portion of turbine passes through the pipe 4 and then flows in parallel through the pipes 5 and 6 to the turbines or turbine sections 7 and 8, also mounted on the shaft 3 beyond the ends of the portion 2. The exhaust from the portions or elements 7 and 8 flows through the pipes 9 and 10 to a pipe 11 which may lead to a condenser or to the atmosphere.

The turbine illustrated is of the axial flow Parsons type. As is well known, steam or other elastic fluid, flowing through such a turbine causes a thrust on the shaft 3. In the present instance, however, steam is made to flow in one direction through the element 2 and in the opposite direction through the elements 7 and 8 so that their thrust will be opposed to that of the element 2. The elements may be so proportioned that the thrust of parts 7 and 8 will be balanced by that due to part 2. If the thrusts are not wholly balanced, any excess in either direction may be taken care of by a thrust bearing 12 at one end of the shaft or in some other suitable location. The unbalanced thrust, however, will be small and the thrust bearing operating under low pressure will cause no trouble. This bearing also prevents endwise movement of the shaft and the turbine wheels or blades mounted thereon, thus serving to keep these wheels or blades in proper alinement with the intermediate blades or buckets. The other end of the shaft may be connected to drive any suitable load. Obviously, the direction of flow through the turbine might be the opposite of that described, or the thrust bearing might be placed at the other end of the shaft if desired.

A stop valve may control the flow of steam to the pipe 1 and the flow through the turbine elements may be controlled by any customary regulating device. Valves may also be located in the pipes 4, 5, 6, 9 and 10 to effect different combinations of the turbine elements or to provide for operating one or more of them when any of the others are disabled.

In accordance with the provisions of the patent statutes, I have described the principle of operation of my invention together with the apparatus which I now consider to represent the best embodiment thereof; but I desire to have it understood that the apparatus shown is only illustrative, and that the invention can be carried out by other means.

What I claim as new and desire to secure by Letters Patent of the United States, is,—

1. In combination, a shaft, a turbine element connected to drive the shaft and through which motive fluid flows in a given direction, a plurality of other turbine elements also connected to drive the shaft, means which receive motive fluid from the first element and delivers it to the other elements in parallel to flow in the opposite direction through them so that the thrusts of the first element and the second elements tend to balance each other.

2. In combination, a shaft, a turbine element or section mounted on the shaft, a conduit for supplying motive fluid to flow in a given direction through the element, a plurality of other turbine elements also mounted on the shaft, means for receiving motive fluid from the first element and for delivering it to the others in parallel and causing it to flow through them in the opposite direction, so that the thrust of the second elements and the thrust of the first element tend to balance each other, and means for conveying away the motive fluid exhausted from the second elements.

3. In combination, a shaft, a high pressure turbine element mounted on the shaft, a conduit for supplying motive fluid to flow through the turbine element in a given direction, a plurality of low pressure turbine elements also mounted on the shaft, a conduit which receives motive fluid exhausted from the high pressure element and delivers it to the low pressure elements in parallel to flow through them in the opposite direction, so that the thrusts of the low pressure elements and the thrust of the high pressure element tend to balance each other, and a thrust-bearing for the shaft which maintains the turbine blades in proper alinement and may receive the unbalanced portion of the thrust.

In witness whereof, I have hereunto set my hand this 21st day of December, 1906.

WILLIAM L. R. EMMET.

Witnesses:
BENJAMIN B. HULL,
HELEN ORFORD.